April 25, 1961     E. NUSSBAUM     2,981,293
HARNESS FRAME
Filed Oct. 10, 1958                                  2 Sheets-Sheet 1
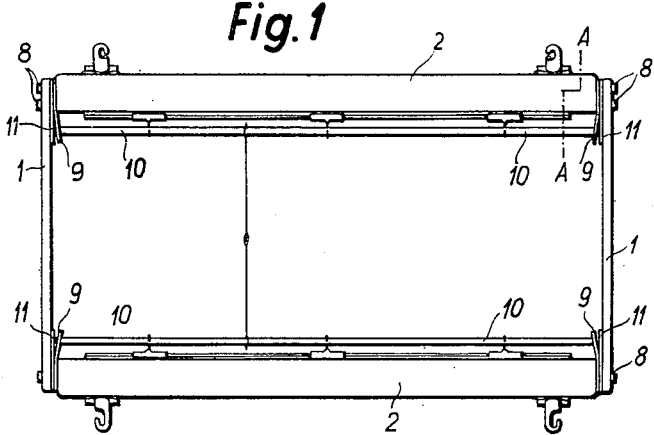
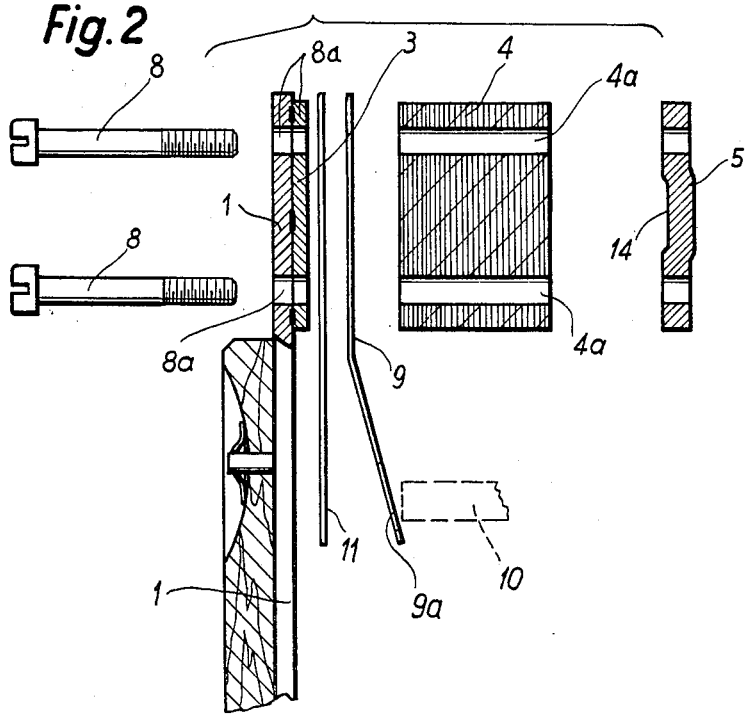
Inventor
Eugen Nussbaum
By
Watson Cole Grindle & Watson
Attys.

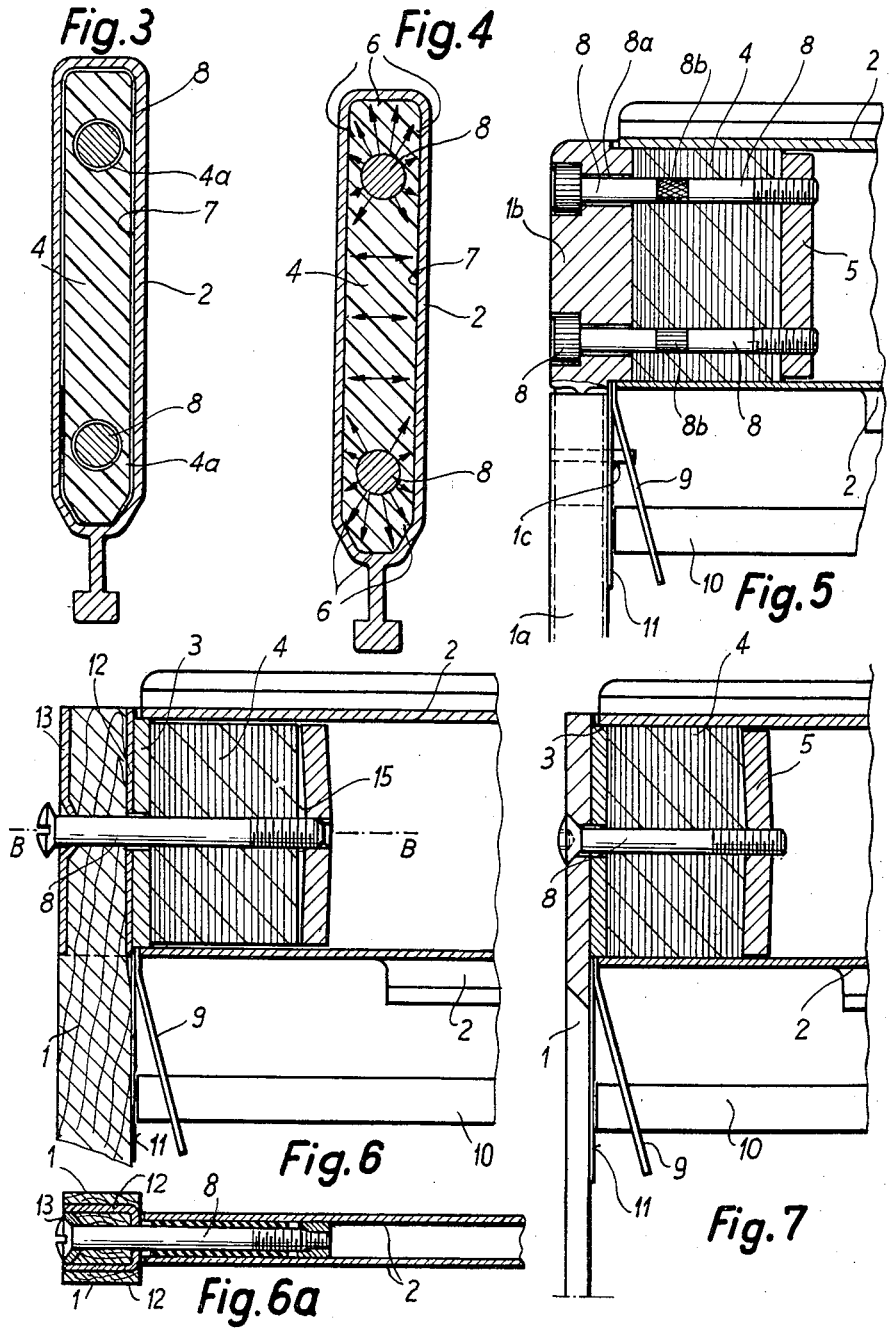

United States Patent Office 2,981,293
Patented Apr. 25, 1961

2,981,293
HARNESS FRAME
Eugen Nussbaum, Muhlehorn, Switzerland, assignor to E. Frohlich A.G., Muhlehorn, Switzerland
Filed Oct. 10, 1958, Ser. No. 766,581
11 Claims. (Cl. 139—91)

The present invention relates to improvements in harness frames in which are provided clamping means for interconnecting the ends of the carrier rods and those of the side stays at the shaft corners.

The invention is essentially characterized in that the clamping means are constituted by independent, elastically yieldable elements which are insertable into corresponding hollow spaces of the carrier rods and which are pressable against the inside walls of the carrier-rods' hollow spaces by straining means which are connected to the side stays.

Further features of the invention spring from the claims, the specification and the accompanying drawings in which are shown, purely by way of example, some embodiments of the novel corner connection. In the drawings—

Fig. 1 shows in elevation a conventional harness frame incorporating the novel corner connection;

Fig. 2 is an exploded view showing the principal corner-connection parts of one embodiment, partly in section;

Fig. 3 illustrates a cross-section on the line A—A of Fig. 1, but in a much larger scale, the parts shown loosely engaging each other;

Fig. 4 shows in the clamping position a cross-section corresponding to Fig. 3;

Fig. 5 depicts a further embodiment in the clamping position, partly in section;

Fig. 6 represents a third embodiment in the non-clamping state, partly in section;

Fig. 6a illustrates a section on the line B—B of Fig. 6, and

Fig. 7 shows a fourth example in the clamping state.

The corner connection disclosed by the present invention essentially comprises a clamping member 4 of elastically yieldable material such as rubber or a suitable plastic. In the carrier rods 2 of the harness frame are provided hollow spaces 7 at least in the end portions thereof, into which are loosely inserted the clamping members 4 when assembling the harness frame. To such end, two threaded bolts 8 are used in the example shown in Fig. 2, which pass through corresponding bores 8a of the side stays and corresponding bores 4a of the clamping member, and which are screw threaded into a metallic counterplate 5. In principle, the unit comprising the side stays 1, the clamping member 4 and the screwed-on counterplate 5 is inserted into the respective end of a carried rod 2, clearance being provided between member 4 and the inside wall of rod 2 on one hand and between bolts 8 and the bores 4a in member 4 on the other hand, which clearance allows of readily inserting the unit. When, in the inserted state of the unit, the bolts 8 are tightened, the counterplate 5 will exert a pressure or cause an upsetting on the clamping member, the latter will expand in the directions shown by the arrows in Fig. 4 and is pressed against the interior wall of the carrier-rod end whereby there is produced a firm and stable connection between the side stays and the carrier rods.

In order to fix the correct relative position between the side stays and the carrier rods, a guide or adapter 3 is rigidly connected, such as by welding, to the respective end of side stay 1. Further, metallic plates 9 and 11 are clamped between said adapter 3 and member 4. Plate 9 is provided with a perforation 9a and serves as bearing for the heddle-filing rail 10. Plate 11 is made of hardened steel and projects into the path of rail 10 so as to protect the side stay 1 against damage through rail 10.

Counterplate 5 is formed so that the clamping action of member 4 is taking place mainly at the outermost points 6 of the carrier-rod hollow space 7, as shown in Fig. 4 which depicts member 4 in the clamping state. To such end, counterplate 5 on the side adjacent the clamping member is provided with a lateral recess 14 into which the material may escape when clamped. In the clamped state, the threaded bolts 8 also are held by the material of member 4 so that the bolts are secured against loosening during operation of the harness frame.

By means of the example shown in Fig. 2, a firm but not absolutely rigid connection is obtained between the side stays 1 and the rods 2 of the harness frame. Forces acting on the harness frame in operation and causing small lateral movements or angular changes between side stays and carrier rods, thus may be balanced so that the corner connections cannot be overstressed thereby. By reason of the fact that a clamping action takes place on the clamping member 4 due to the specially shaped counterplate 5, there is prevented, at the outermost points 6 of the carrier-rod hollow space 7, a swelling or bulging of the carrier-rod profile in the center. By tightening the threaded bolts 8, not only the clamping action is obtained but also the side stays 1 are drawn into the carrier rod. Thereby, any play of the plates 9 and 11 which are clamped therebetween, is rendered impossible.

The novel corner connection described allows of providing the most diversified kinds of side stays as required by the type of loom on hand. Thus, Fig. 2 shows the example of a side stay which consists of a metallic rod provided with wooden protection.

In Fig. 5 is shown another type of side stay, namely a two-part stay. Into the stay 1a may be plugged an end member 1b which is securable by a pin 1c. End member 1b comprises bores 8a for guiding the threaded bolts 8 and is integral with a guide or adapter. In this example it is shown yet that the threaded bolts on their portion passing through the clamping member comprise a knurled portion 8b for additionally locking the bolts 8 against becoming loose in operation.

In the embodiment shown in Fig. 6, the side stay at its end comprises a U-shaped metallic cuff 12 which on the open side of the U-legs is closed by a counterplate 13 for retaining the bolts 8. The guide or adapter 3 is secured to cuff 12 by welding, for example. In the example according to Fig. 6, counterplate 5 comprises a somewhat different central recess 15 than counterplate 5 in Fig. 2.

In the embodiment shown in Fig. 7, the side stay 1 consists of a steel rail to the ends of which is fixed a guide or adapter 3, such as by welding. In this example a single bolt 8 is provided.

The present invention provides a corner connection which ensures, on one hand, a firm connection between side stays and carrier rods, which, however, is not absolutely rigid and allows, on the other hand, a simple assembly and disassembly of the harness frame without any need for special tools.

I claim:

1. A harness frame having hollow carrier rods and side stays comprising corner connections for the rods and stays, clamping means for each corner connection between the carrier rods and the side stays and consisting of independent and elastically yieldable elements which are insertable in the corresponding hollow spaces of the carrier rods, straining means to press the elements against the interior wall of said hollow spaces, said straining means comprising at least one threaded bolt supported on said stays and passing through said element, and a rigid counterplate having threaded bores into which said bolt is engaged in threaded contact and tightened to upset said element and press it against the inside wall of said rods.

2. A harness frame having hollow carrier rods and side stays comprising corner connections for the rods and stays, clamping means for each corner connection between the carrier rods and the side stays and consisting of independent and elastically yieldable elements which are insertable in the corresponding hollow spaces of the carrier rods, straining means to press the elements against the interior wall of said hollow spaces, and adapters connected to said stays and fitted into said hollow spaces to provide the relative correct position of said stays and rods.

3. A harness frame having hollow carrier rods and side stays comprising corner connections for the rods and stays, clamping means for each corner connection between the carrier rods and the side stays and consisting of independent and elastically yieldable elements which are insertable in the corresponding hollow spaces of the carrier rods, straining means to press the elements against the interior wall of said hollow spaces, adapters connected to said stays and fitted into said hollow spaces to provide the relative correct position of said stays and rods, and a plate clamped between the adapter and the clamping element, said plate having an opening for mounting a heddle-filing rail.

4. A harness frame having hollow carrier rods and side stays comprising corner connections for the rods and stays, clamping means for each corner connection between the carrier rods and the side stays and consisting of independent and elastically yieldable elements which are insertable in the corresponding hollow spaces of the carrier rods, straining means to press the elements against the interior wall of said hollow spaces, adapters connected to said stays and fitted into said hollow spaces to provide the relative correct position of said stays and rods, and a hardened steel plate clamped between the adapter and the clamping element, said plate projecting into the range of a filing rail and protecting the side stay against damage by said rail.

5. A harness frame having hollow carrier rods and side stays comprising corner connections for the rods and stays, clamping means for each corner connection between the carrier rods and the side stays and consisting of independent and elastically yieldable elements which are insertable in the corresponding hollow spaces of the carrier rods, straining means to press the elements against the interior wall of said hollow spaces, said straining means comprising at least one threaded bolt supported on said stays and passing through said element, and a rigid counterplate having threaded bores into which said bolt is engaged in threaded contact and tightened to upset said element and press it against the inside wall of said rods, the counterplate being so formed that the clamping action of the clamping element mainly takes place at the outermost points of said hollow space.

6. A harness frame having hollow carrier rods and side stays comprising corner connections for the rods and stays, clamping means for each corner connection between the carrier rods and the side stays and consisting of independent and elastically yieldable elements which are insertable in the corresponding hollow spaces of the carrier rods, straining means to press the elements against the interior wall of said hollow spaces, said straining means comprising at least one threaded bolt supported on said stays and passing through said element, and a rigid counterplate having threaded bores into which said bolt is engaged in threaded contact and tightened to upset said element and press it against the inside wall of said rods, the counterplate being so formed that the clamping action of the clamping element mainly takes place at the outermost points of said hollow space, and the counterplate has a recess on the side adjacent the clamping element.

7. A harness frame having hollow carrier rods and side stays comprising corner connections for the rods and stays, clamping means for each corner connection between the carrier rods and the side stays and consisting of independent and elastically yieldable elements which are insertable in the corresponding hollow spaces of the carrier rods, straining means to press the elements against the interior wall of said hollow spaces, and adapters connected to said stays and fitted into said hollow spaces to provide the relative correct position of said stays and rods, and the side stays comprising a metallic bar having connected thereto the adapter and a protecting means.

8. A harness frame having hollow carrier rods and side stays comprising corner connections for the rods and stays, clamping means for each corner connection between the carrier rods and the side stays and consisting of independent and elastically yieldable elements which are insertable in the corresponding hollow spaces of the carrier rods, straining means to press the elements against the interior wall of said hollow spaces, and adapters connected to said stays and fitted into said hollow spaces to provide the relative correct position of said stays and rods, and each of the side-stay ends which serve for the corner connection, together with the adapters comprises a single body.

9. A harness frame having hollow carrier rods and side stays comprising corner connections for the rods and stays, clamping means for each corner connection between the carrier rods and the side stays and consisting of independent and elastically yieldable elements which are insertable in the corresponding hollow spaces of the carrier rods, straining means to press the elements against the interior wall of said hollow spaces, and adapters connected to said stays and fitted into said hollow spaces to provide the relative correct position of said stays and rods, and each of the side-stay ends which serve for the corner connection, together with the adapters comprises a single body, and the side-stay ends which serve for the corner connection being plugged into a stay shank and secured therein.

10. A harness frame having hollow carrier rods and side stays comprising corner connections for the rods and stays, clamping means for each corner connection between the carrier rods and the side stays and consisting of independent and elastically yieldable elements which are insertable in the corresponding hollow spaces of the carrier rods, straining means to press the elements against the interior wall of said hollow spaces, and adapters connected to said stays and fitted into said hollow spaces to provide the relative correct position of said stays and rods, the sidestay ends which serve for the corner connection being provided with a U-shaped metallic cuff which is closed by a counterplate on the open side of U-legs, the adapter being secured to said cuff.

11. A harness frame having hollow carrier rods and side stays comprising corner connections for the rods and stays, clamping means for each corner connection between the carrier rods and the side stays and consisting of independent and elastically yieldable elements which are insertable in the corresponding hollow spaces of the carrier rods, straining means to press the elements against the interior wall of said hollow spaces, said straining means comprising at least one threaded bolt supported on said stays and passing through said element, and a rigid counterplate having threaded bores into which said bolt is engaged in threaded contact and tightened to upset said element and press it against the inside wall of said rods, the threaded bolt being knurled on the portion passing through the clamping member.

References Cited in the file of this patent
UNITED STATES PATENTS 2,897,844   Graf ------------------ Aug. 4, 1959